June 18, 1963 J. A. GAYLORD 3,094,345
SEPARABLE LINE COUPLING
Filed Feb. 8, 1962
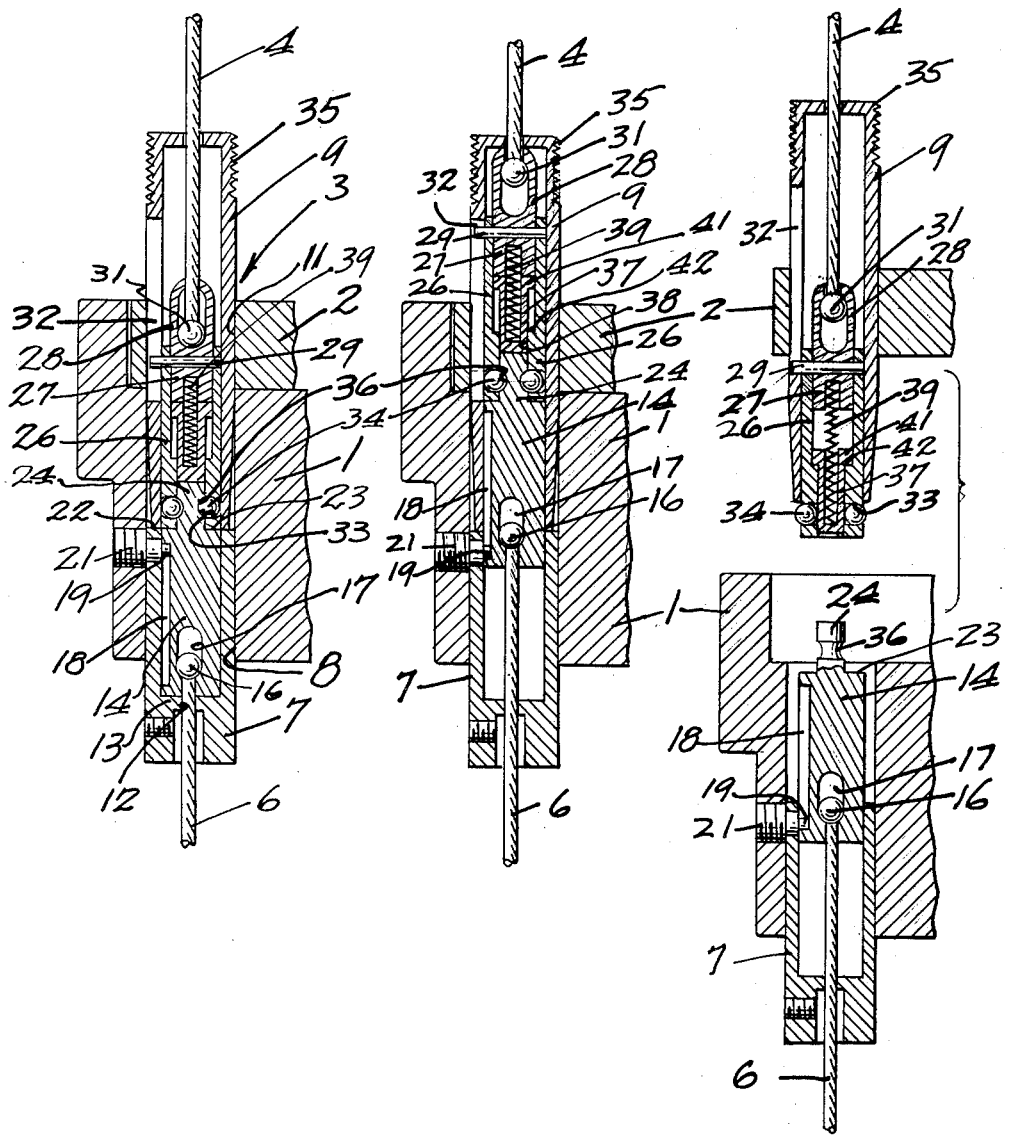
INVENTOR.
JOHN A. GAYLORD
BY George B White
ATTY

3,094,345
SEPARABLE LINE COUPLING
John A. Gaylord, San Rafael, Calif., assignor to H. Koch & Sons, Corte Madera, Calif., a corporation of California
Filed Feb. 8, 1962, Ser. No. 171,980
4 Claims. (Cl. 287—76)

This invention relates to a separable line coupling.

The primary object of this invention is to provide a line pulling coupling which can be separated so that the coupling may be utilized in connection with separable connection devices of the type described in my copending application Serial No. 677,548 filed August 12, 1957, now Patent No. 3,038,472 and entitled "Separable Connection Devices for Survival Kits." As shown in my said copending application, it is important to connect various manipulating lines to the survival kit, which lines, however, must be separated when the kit is dropped so as to hang from the parachute or the person in the air.

The primary object of the invention is to provide a device which positively couples a pull line for transmitting manipulating pull to certain devices, such as actuating devices in survival kit, but which pulling coupling is automatically disconnected or separated when the unit on which it is utilized is separated.

Particularly it is an object of the invention to provide a pull line coupling device which positively couples a pair of lines through separable elements so that when said separable elements are separated, the coupling is automatically pulled apart and is disconnected.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a cross-sectional view of my separable coupling in coupled position assembled in separable parts of a device.

FIG. 2 is a sectional view showing the coupling as it exerts a pull on the line.

FIG. 3 is a sectional view showing the coupling separated when the body in which it is used is also separated.

In carrying out my invention, the same is illustrated in connection with the separable connecting device for aerial survival kits. In the herein illustration the body 1 of the separable connecting device has thereon a separable member 2 which are releasably held together by means shown in my copending application and which are not pertinent to the invention herein, except that when the connecting means are released so that the body 1 and the member 2 are moved apart, then my line coupling 3 should be also allowed to separate.

The line coupling 3 is for the purpose of transmitting pulling force from a manipulating line 4 to an actuating line 6, the latter being suitably connected to any particular device in the survival kit for actuating the same.

The casing of the coupling 3 is made in two sections, namely lower coupling casing 7 suitably secured in a hole 8 in the body 1, and an upper coupling casing 9 suitably secured into a hole 11 in the separable member 2. The holes 8 and 11 are automatically in registry when the body 1 and member 2 are held together in the manner shown in my said copending application.

The actuating line 6 extends through a hole 12 in the bottom 13 of the lower coupling casing 7 and to a plunger 14 reciprocable axially in the lower casing 7. The line 6 may be secured to the bottom of the plunger 14 in any suitable manner such as by a securing ball 16 on the end of the line 6 held in a socket 17 in the plunger 14. On one side of the plunger 14 is a longitudinal slot 18 which rides on a pin 19 projecting into said slot 18 from a plug 21 which is suitably secured in the adjacent side of the body 1 so as to extend into the adjacent portion of the lower casing 7. The length of the slot 18 determines the stroke of the plunger 14 in the lower casing 7. The upper end of the lower casing 7 is open and the plunger 14 extends from the bottom 13 of the lower casing 7 to the top 22 of said lower casing 7 where it forms into a suitable shoulder 23 under a projecting neck 24, the latter projecting beyond the end 22.

The upper coupling casing 9 extends into the upper portion of the hole 8, it being noted that the lower coupling 7 extends only to about half way in the hole 8. Thus the upper half of the hole 8 is occupied by the lower end of the upper coupling casing 9. To facilitate movement of the upper coupling casing 9 into and out of the upper portion of the hole 8, the said lower end of the upper coupling 9 is tapered as shown.

In the hollow upper coupling casing 9 is reciprocable a pulling plunger 26. In the top of the pulling plunger 26 is held the hub 27 of a loop 28, by means of a crosspin 29. In the loop 28 is held a ball 31 on the end of the line 4 extending into said loop so as to transmit pull therethrough. An end of the pin 29 projects into a slot 32 in the adjacent side of the upper coupling casing 9 so as to determine the stroke of reciprocation of the plunger 26.

The lower end of the pulling plunger 26 fits over the neck 24 of the lower plunger 14. A plurality of suitable ball sockets 33 in said lower end of the pulling plunger 26 have coupling balls 34 therein. The sockets 33 are so peened as to limit the outward movement of the balls 34 in said sockets 33. The balls 34 fit into an annular groove socket 36 around the neck 24 in the manner shown in FIGS. 1 and 2 so that when the lower end of the pulling plunger 14 is surrounded by the lower end of the upper coupling casing 9, the balls 34 are held in coupling engagement with the groove socket 36. Thus, when the pulling plunger 26 is pulled by the pulling cord 4, the lower plunger 14 is coupled and moved therewith and transmits the pull to the actuating line 6.

It is to be noted that the upper end of the upper coupling casing 9 is closed and is provided with suitable external threads 35 to accommodate a suitable cap thereon, not shown.

As long as the separable body 1 and member 2 are coupled together by other suitable means, the coupling device herein remains coupled as the balls 34 are confined at all times by the hollow upper coupling casing 9. When the body 1 and member 2 are disconnected and separated in the manner shown in FIG. 3, then the upper coupling casing 9 is pulled upwardly with the member 2 or the lower casing 7 is moved downwardly with the body 1, as the case may be. The plunger 14 and the pulling plunger 26 remain coupled to the end of the stroke of the respective plungers as shown in FIG. 3, at which time the lower plunger 14, by reason of the separation, pulls the pulling plunger 26 out of the tapered end of the upper coupling casing 9. The spacing between the lower end of the slot 32 of the upper coupling casing 9 and the tip or the lower end of said coupling casing 9 is equal or shorter than the distance between the pin 29 and the top level of the ball sockets 33, so that when the pulling plunger 26 is pulled out of the open end of the upper casing 9, as shown in FIG. 3, then the balls 34 are permitted to move outwardly sufficiently to be disengaged from the groove socket 36. Inasmuch as there is no force to hold the balls 34 in the groove socket 36 after they are freed from the tip of the coupling casing 9, the force of pull of separation of the parts is sufficient, in coaction with the curvature of the groove socket 36, to push the balls 34 outwardly and thereby disengage the neck 24 from the lower end of the plunger 26, as shown in FIG. 3.

In order to assure the disengagement of the neck 24 when the balls 34 are freed, an ejector member 37 is slidable in the hole 38 in the lower end of the plunger 26 in engagement with the top of the neck 24. A coil spring 39 within the plunger 26 bears against the loop hub 27 and at its other end against the ejector 37 so as to urge the ejector 37 against the top of the neck 24. A flange 41 on the top of the ejector member 37 is enlarged and abuts against shoulder 42 in said pulling plunger 26 to limit the movement of the ejector member 37 to the position shown in FIG. 3, namely against the balls 33.

In order to reassemble the coupling, the separable parts are pushed together so that the top of the neck 24 is pressed against the ejector member 37 and pushes the latter inwardly until the groove socket 36 on the neck 24 is in registry with the balls 34. The shoulder 23 is spaced from the groove socket 36 the same distance as the spacing between the balls 34 and the lower end of the pulling plunger 26. Thus in said registering position the shoulder 23 pushes the plunger 26 upwardly and into the upper coupling casing 9, whereupon the upper casing 9 will operate to force the balls 34 inwardly into firm engagement with the groove socket 36 for the coupling, as shown in FIGS. 1 and 2. As long as the body 1, and separable member 2 are held together, the herein separable coupling efficiently and firmly couples the lines 4 and 6, but upon the separation of body 1 and the separable member 2, the coupling automatically and positively separates so that the body 1 with the line 6 is free to drop without interfering or entanglement with said lines.

The pockets 28 and 17 respectively are axially elongated so as to permit limited longitudinal play of the respective securing balls 31 and 16 therein.

I claim:

1. A separable line coupling device for manipulating lines extended through separable members, comprising
   (a) a first hollow coupling casing adapted to be secured in one of said separable members,
   (b) a second hollow coupling casing secured in the other separable member,
   (c) a reciprocating plunger in each of said hollow casings,
   (d) coacting means between each plunger and the adjacent casing to limit the stroke of reciprocation of the respective plungers and the respective casings,
   (e) a line connected to each of said plungers,
   (f) releasable clamping elements on the plunger in said second casing held in clamping relation to the plunger of the first casing when said separable members are coupled, said clamping elements being releasable when pulled at a predetermined distance by the plunger of the first casing when said members are separated.

2. A separable line coupling device for manipulating lines extended through separable members, comprising
   (a) a first hollow coupling casing adapted to be secured in one of said separable members,
   (b) a second hollow coupling casing secured in the other separable member,
   (c) a reciprocating plunger in each of said hollow casings,
   (d) coacting means between each plunger and the adjacent casing to limit the stroke of reciprocation of the respective plungers and the respective casings,
   (e) a line connected to each of said plungers,
   (f) a projection from the plunger in the first casing extensible into the plunger of the second casing,
   (g) a plurality of balls loosely held in said plunger of the second casing around said projection, said balls being adapted to be pushed outwardly out of engagement from said projection upon the outward reciprocation of said plungers relatively to the respective casings when said members are separated, 3. In a line coupling for separable parts of a device;
   (a) a first hollow casing adapted to be secured in one of said separable parts and
   (b) a second coupling casing adapted to be secured in the other separable part,
   (c) a plunger reciprocable in said first casing,
   (d) coacting means to determine the stroke of reciprocation of said first plunger in said first casing,
   (e) a line connected to said first plunger,
   (f) a second plunger reciprocable in said second coupling casing,
   (g) means to connect another line to said second plunger in said second casing,
   (h) coacting means between said second plunger and the second casing to determine the stroke of reciprocation thereof so that at one end of said stroke an end of said second plunger is exposed beyond the adjacent end of said second casing,
   (i) a projection on said first plunger insertable into the end of said second plunger,
   (j) a plurality of outwardly movable balls in said exposed end of said second plunger,
   (k) socket means in said projection of the first plunger engaged by said balls when said exposed end of said second plunger is pushed into said second casing,
   (l) said first and second plungers being engageable with one another so as to push said second plunger into said second casing when said parts are connected together so as to couple said plungers and permit reciprocating of said plungers together to transmit movement from one line to the other while the said parts are connected.

4. In a coupling for separable parts of a device;
   (a) a first hollow casing adapted to be secured in one of said separable parts and
   (b) a second coupling casing adapted to be secured in the other separable part,
   (c) a plunger reciprocable in said first casing,
   (d) coacting means to determine the stroke of reciprocation of said first plunger in said first casing,
   (e) a line connected to said first plunger,
   (f) a second plunger reciprocable in said second coupling casing,
   (g) means to connect another line to said second plunger in said second casing,
   (h) coacting means between said second plunger and the second casing to determine the stroke of reciprocation thereof so that at one end of said stroke an end of said second plunger is exposed beyond the adjacent end of said second casing,
   (i) a projection on said first plunger insertable into the end of said second plunger,
   (j) a plurality of outwardly movable balls in said exposed end of said second plunger, (k) socket means in said projection of the first plunger engaged by said balls when said exposed end of said second plunger is pushed into said second casing, (l) said first and second plungers being engageable with one another so as to push said second plunger into said second casing when said parts are connected together so as to couple said plungers and permit reprocating of said plungers together to transmit movement from one line to the other while the said parts are connected, (m) and ejector means in said second plunger bearing against the end of said projection of said first plunger to push the latter out of engagement from the second plunger and from said balls when said exposed end of said second plunger is in exposed position.

References Cited in the file of this patent

UNITED STATES PATENTS

| | | |
|---|---|---|
| 2,432,509 | Cotton | Dec. 16, 1947 |
| 2,656,203 | Musser | Oct. 20, 1953 |
| 2,859,422 | Oliveau | Nov. 4, 1958 |